Patented June 30, 1953

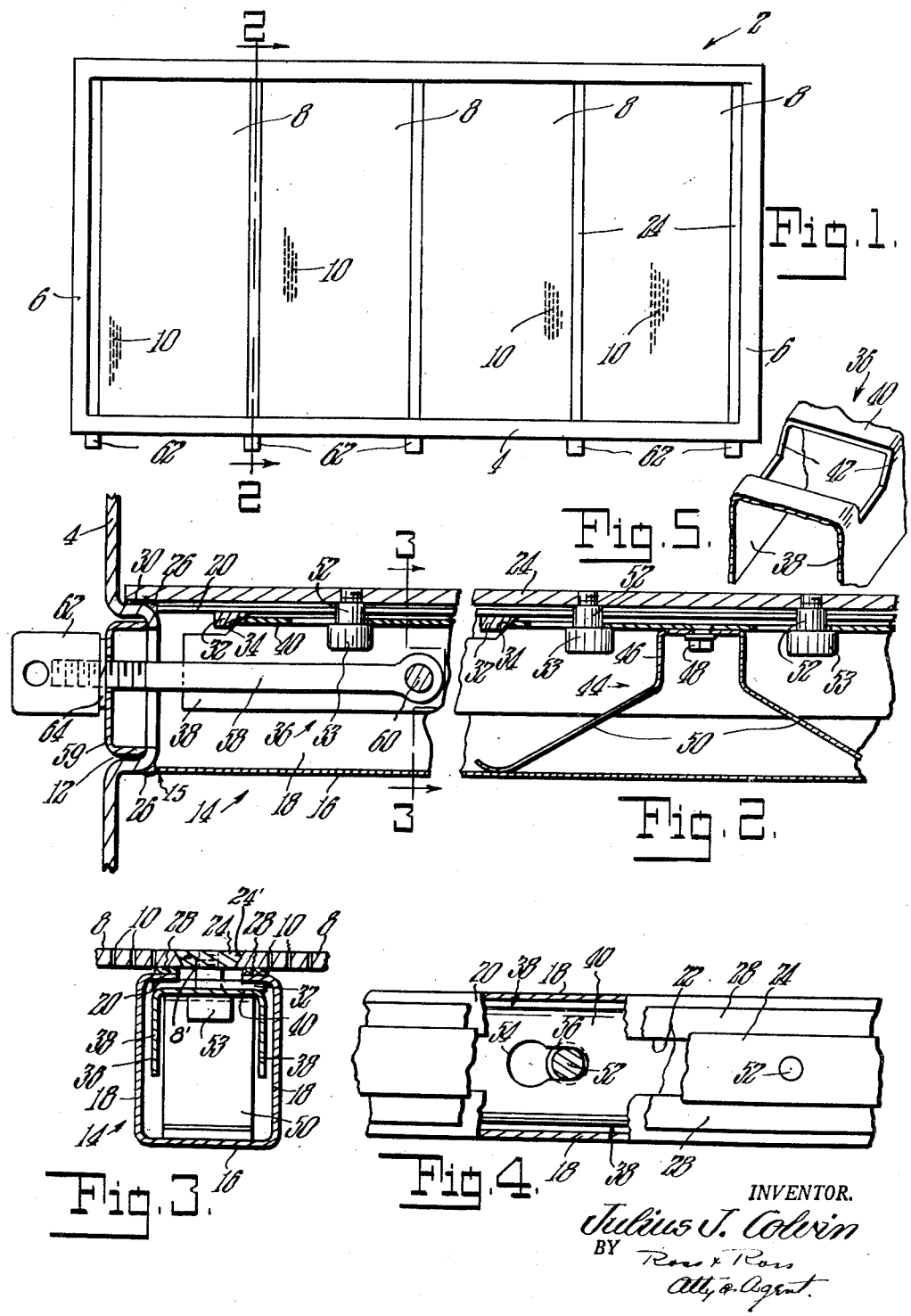

2,643,586

UNITED STATES PATENT OFFICE 2,643,586

SCREEN APPARATUS

Julius J. Colvin, Hudson Falls, N. Y.

Application May 16, 1951, Serial No. 226,674

4 Claims. (Cl. 92—31)

This invention relates to improvements in screens and is directed more particularly to improvements in screen apparatus for screening paper making stock.

The principal object of the invention is the provision of novel means for clamping screen plates in screen apparatus such as referred to in U. S. Patent 1,578,590 of March 30, 1926.

Screens of the type to which the invention relates include a plurality of rigid metal plates having a multiplicity of apertures therethrough which in many cases are in the form of very fine slits or slots. The screen plates are disposed in a vat and paper making stock (fibers suspended in water) flows onto the upper sides of the plates and is screened.

According to the novel features of this invention novel mechanism is provided for releasably securing the screen plates in screening relation. The mechanism is easily and readily operated so that screen plates may be secured in and removed from the vat and functions to efficiently hold the plates for the screening operation.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Fig. 1 is a plan view of screen apparatus embodying the novel features of the invention;

Fig. 2 is an elevational sectional view along one of the screen plate clamp members on the line 2—2 of Fig. 1;

Fig. 3 is a sectional elevational view on the line 3—3 of Fig. 2;

Fig. 4 is a partial plan view of one of the hold down or clamp members of the screen locking mechanism; and Fig. 5 is a partial perspective view of an actuator to show the cam face thereof.

Referring now to the drawings more in detail, the invention will be fully described.

A screen vat is represented by 2 which has longitudinal side walls 4 and transverse end walls 6. Screen plates are represented generally by 8 in Fig. 1 and are provided with apertures therethrough which may be in the form of elongated slots or slits 10.

The walls of the vat may be formed from any suitable material but as shown in Fig. 2, the said walls are formed from sheet metal and the side walls have grooves such as 12 extending therealong.

Transverse struts such as 14 extend between the side walls 4. These have lower walls 16, side walls 18 and upper walls 20. The upper walls are provided with elongated slots 22, see Fig. 4. The upper walls of the struts at the sides of the slots are upper supporting portions for side edges of screen plates.

Elongated clamp bars 24 are provided which have downwardly converging opposite sides such as 24' as shown in Fig. 3.

Opposite ends such as 15 of the struts 14 are welded at 26 to the opposite side walls 4 and the screen plates 8 are supported on opposite side edges by packings 28 on the struts, see Fig. 3, and on opposite ends by packings 30, see Fig. 2.

The screen plates 8 have longitudinal side edges such as 8' which are complemental to the side edges of the clamp bars so that as the clamp bars are urged downwardly the said plates are urged against the packings and clamped by the bars 24.

Cams 32 are secured at intervals along the struts 14 and at the underside of the upper walls 20 thereof as by welding or the like. Said cams 32 have rear inclined cam faces 34, see Fig. 2.

Elongated actuators 36 are disposed within the struts and have side walls 38 and upper walls 40 arranged in the form of inverted U's, see Figs. 3 and 4.

At intervals therealong the upper and side walls 40 and 38 of the actuators 36 are cut away as shown in Fig. 5 to provide cam faces 42 for co-acting with the faces 34 of cams 32.

Spring means is provided for each actuator 36 which may include one or more springs 44 having upper portions 46 secured to the upper walls 40 of the actuators by bolts 48 or the like.

Resilient arms 50 extend in diverging relation from the upper portions of the spring members which engage the lower walls 16 of the struts.

The spring members function to urge the actuators upwardly and to resist downward movements thereof.

Studs 52 are in threaded engagement with clamp members 24 and have heads 53 disposed therebelow. The upper portions 40 of the actuators are provided with openings 54 through which the heads 53 may pass and slots 56 in communication therewith, see Fig. 4.

Operating members 58 are rotatable in members 59 adjacent one side wall 4 of the vat and are pivotally connected to pivot pins 60 extending between side portions 38 of the actuators 36. Outer ends of the members 58 are threaded and manually engageable nut-like members 62 are in threaded engagement therewith and bear on washers 64.

By turning the members 62 in one direction, the operating members are moved forwardly in clamping direction so that the cam faces 42 of the actuators 36 act on the faces 34 of the cams 32 to move the actuators downwardly against springs 44. As the members 62 are turned in an opposite direction, the actuators are moved upwardly by the springs and rearwardly from clamping position by coaction of the cam faces 34 and 42.

With the actuators 36 in non-clamping position, the clamps 24 may be removed upwardly to release plates 8. The heads 53 of studs 52 pass through the holes 54 of the actuators for this purpose.

Plates 8 may be placed on the packings 28 and 30 subsequent to which clamp members 24 are placed in clamping position, the heads of studs passing through the openings in the actuators as the clamps are disposed on and between the screen plates.

The manually engageable members 62 are rotated so that members 58 are moved in clamping direction and thereby move the actuators 36. As the actuators are moved to clamping position shown in Fig. 2, the studs pass into the slots 56 of the actuators. The cam faces 42 of the actuators engage faces 34 of cams 32 and the heads 53 of the studs 52 underlying the upper portions 40 of the actuators cause the studs to pull the clamp members 24 downwardly against the edges of the screen plates to securely clamp them in place.

The screen plates may be removed by turning the members 62 in a reverse direction to move the actuators to non-clamping position for releasing the studs 52 of the clamp members 24 from the actuators.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Mechanism for releasably clamping a plurality of perforated screen plates in adjacency in screening apparatus having opposite and adjacent elongated side and transverse end walls comprising in combination, elongated hollow transverse struts extending between said side walls in spaced relation and having opposite ends secured thereto and provided with elongated slots along upper sides thereof and upper supporting wall portions along opposite sides of said slots for supporting spaced adjacent side edge portions of adjacent screen plates, elongated actuators movable back and forth within and longitudinally of said struts between clamping and non-clamping positions, separate cooperating engageable cam portions carried by upper supporting portions of said struts and by adjacent upper sides of the actuators carried by the upper supporting portions of said struts and by the upper sides of said actuators arranged and adapted as the actuators are moved to clamping position to urge the actuators downwardly relative to the struts for a clamping action, elongated clamp bars having longitudinal opposite edges for overlying longitudinal adjacent side edges of adjacent screen plates and provided with longitudinally spaced studs extending downwardly therefrom having upper shanks and lower enlarged head portions, said actuators provided with longitudinally spaced openings through which said enlarged head portions of the studs may pass and with longitudinal slots extending therefrom in which the shanks of the studs are receivable as the actuators are moved to clamping position, and manually engageable means connected to said actuators for independently moving said actuators back and forth, all adapted and arranged whereby as the actuators are moved to clamping position the shanks of the studs are entered in the slots thereof so that the enlarged head portions thereof underlie upper sides of the actuators and said actuators are moved downwardly by said cam means so that the actuators through the enlarged head portions of said studs act on and urge the clamp bars downwardly to exert pressure on the edges of adjacent screens.

2. Mechanism for releasably clamping a plurality of perforated screen plates in adjaceny in screening apparatus having opposite and adjacent elongated side and transverse end walls comprising in combination, elongated hollow transverse struts extending between said side walls in spaced relation and having opposite ends secured thereto and provided with elongated slots along upper sides thereof and upper supporting wall portions along opposite sides of said slots for supporting spaced adjacent side edge portions of adjacent screen plates, elongated actuators movable back and forth within and longitudinally of said struts between clamping and non-clamping positions, separate cooperating engageable cam portions carried by upper supporting portions of said struts and by adjacent upper sides of the actuators carried by the upper supporting portions of said struts and by the upper sides of said actuators arranged and adapted as the actuators are moved to clamping position to urge the actuators downwardly relative to the struts for a clamping action, elongated clamp bars having longitudinal opposite edges for overlying longitudinal adjacent side edges of adjacent screen plates and provided with longitudinally spaced studs extending downwardly therefrom having upper shanks and lower enlarged head portions, said actuators provided with longitudinally spaced openings through which said enlarged head portions of the studs may pass and with longitudinal slots extending therefrom in which the shanks of the studs are receivable as the actuators are moved to clamping position, and manually engageable means connected to said actuators for independently moving said actuators back and forth, all adapted and arranged whereby as the actuators are moved to clamping position the shanks of the studs are entered in the slots thereof so that the enlarged head portions thereof underlie upper sides of the actuators and said actuators are moved downwardly by said cam means so that the actuators through the enlarged head portions of said studs act on and urge the clamp bars downwardly to exert pressure on the edges of adjacent screens, and spring means between lower portions of said struts and actuators urging the latter upwardly.

3. Clamping mechanism as set forth in claim 1 wherein said engageable cam portions include cams extending across the slots of the struts and secured thereto and having inclined faces and said struts provided with inclined face portions engageable therewith.

4. Clamping mechanism according to claim 2 wherein longitudinal side edges of said clamp bars are arranged in downwardly relatively diverging relation and adjacent sides of adjacent screen plates are arranged complemental thereto.

JULIUS J. COLVIN.

References Cited in the file of this patent

UNITED STATES PATENTS

| Number | Name | Date |
|---|---|---|
| 628,234 | Smith | July 4, 1899 |
| 691,531 | Clark | Jan. 21, 1902 |
| 1,251,274 | Patridis | Dec. 25, 1917 |
| 1,578,590 | Fancher | Mar. 30, 1926 |
| 1,889,770 | Black | Dec. 6, 1932 |
| 2,180,373 | Sibley et al. | Nov. 21, 1939 |